US012766602B2

(12) United States Patent
Uchiyama et al.

(10) Patent No.: US 12,766,602 B2
(45) Date of Patent: Oct. 20, 2026

(54) MACHINE TOOL SYSTEM

(71) Applicant: STAR MICRONICS CO., LTD., Shizuoka (JP)

(72) Inventors: Takuji Uchiyama, Shizuoka (JP); Takeshi Ikegaya, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 412 days.

(21) Appl. No.: 18/479,750

(22) Filed: Oct. 2, 2023

(65) Prior Publication Data

US 2024/0109129 A1 Apr. 4, 2024

(30) Foreign Application Priority Data

Oct. 4, 2022 (JP) ................................ 2022-160309

(51) Int. Cl.
*B23B 7/12* (2006.01)

(52) U.S. Cl.
CPC .................................... *B23B 7/12* (2013.01)

(58) Field of Classification Search
CPC ....... B23B 13/021; B23B 13/02; B23B 25/06; B23Q 17/2291; B23Q 17/22; G05B 2219/50386
See application file for complete search history.

(56) References Cited

U.S. PATENT DOCUMENTS

2018/0036854 A1 2/2018 Takano

FOREIGN PATENT DOCUMENTS

| | | | |
|---|---|---|---|
| JP | S5981001 A | 5/1984 |
| JP | H0588802 U | 12/1993 |
| JP | H1071504 A | 3/1998 |
| JP | 2001310201 A | 11/2001 |
| JP | 2005313267 A | 11/2005 |

OTHER PUBLICATIONS

Iemca: VIP80E-II, VIP80Er-II Manual for Use and Maintenance, Sep. 1, 2008 (Year: 2008).*
Iemca VIP80E-II VIP80Er-II EN Manual for Use and Maintenance, Sep. 1, 2008, XP093132636.
Notice of Reasons for Refusal in application No. 2022-160309 dated Jul. 22, 2026 and its english translation; pp. 1-21.

* cited by examiner

*Primary Examiner* — Alan Snyder
(74) *Attorney, Agent, or Firm* — MUNCY, GEISSLER, OLDS & LOWE, P.C.

(57) ABSTRACT

A machine tool system of the present invention includes a rotatable spindle capable of releasably gripping a bar, a pusher that biases the bar from a rear end thereof toward a front end thereof to be movable together with the bar in a Z1-axis direction thereof, and an abnormality determining unit that determines whether an abnormality occurs by monitoring movement of the pusher in the Z1-axis direction. The spindle is movable in the Z1-axis direction, and the abnormality determining unit determines that a first abnormality occurs when the moving distance of the spindle differs from the moving distance of the pusher in a state that the spindle grips the bar.

8 Claims, 10 Drawing Sheets

MACHINE TOOL SYSTEM

CROSS-REFERENCE TO RELATED APPLICATIONS

This application claims priority of Japanese Patent Application No. 2022-160309 filed on Oct. 4, 2022. The contents of this application are incorporated herein by reference in their entirety.

BACKGROUND OF THE INVENTION

The present invention relates to a machine tool system having a spindle that is rotatable while gripping a bar.

Conventionally, there is a machine tool system that includes a machining apparatus having a machining tool and a spindle, and a bar feeder that supplies a long bar to the machining apparatus. See Japanese Unexamined Patent Application Publication No. 2005-313267. The spindle of the machining apparatus rotates while releasably gripping the bar. The spindle is movable in the axial direction of the bar regardless of whether the spindle grips or releases the bar. Alternatively, there is a spindle-fixed type machining apparatus having a spindle fixed to a leg, which is a base. An NC apparatus is built into the machining apparatus. The NC apparatus controls the operation of the spindle or the tool post to which the machining tool is attached according to a machining program (NC program) created by the operator of the machining apparatus or an input operation by using the operation panel provided in the machining apparatus. The NC apparatus controls the operation of the tool post and the spindle according to the machining program, and accordingly, the front end portion of the bar is machined into a desired shape and the machined portion having been machined is cut off. In many cases, the bar is gripped by the spindle from when the machining tool starts machining until the machining tool cuts off the machined portion. The machining apparatus performs a grip change of the bar after cutting off the machined portion. In the grip change, the spindle releases the bar, moves toward the rear end of the bar, and then grips the bar again. A plurality of products corresponding to the number of cycles are manufactured from one bar by repeating machining with the machining tool and a grip change of the bar for a plurality of cycles. When a product with a length exceeding the movable distance of the spindle is manufactured, a grip change operation may be performed within a single cycle.

The bar feeder is provided alongside the machining apparatus so as to be closer to the rear end of the bar than the machining apparatus is. The bar feeder has a pusher and a pusher driving mechanism that moves the pusher in the axial direction of the bar. The pusher has a finger chuck at the front end thereof. The finger chuck grips the rear end portion of the bar, and accordingly, the pusher is coupled to the bar. Then, the pusher driving mechanism feeds the pusher toward the front end of the bar, and accordingly, the bar input to the bar feeder is supplied to the machining apparatus. While the machining apparatus performs machining, the pusher biases the bar from the rear end of the bar toward the front end of the bar with a predetermined load. This load is set to a relatively small load that does not cause a slip between the bar and the spindle when the spindle grips the bar.

SUMMARY

Conventionally, in the machine tool system having the machining apparatus and the bar feeder, individual devices separately determine whether various abnormalities occur. There is a determination method that determines whether a positional abnormality in the axial direction of the bar occurs during machining by recording the machining length of a single cycle in advance in the bar feeder and checking, after completion of the single cycle, whether the machining length matches the moving distances of the pusher before and after the single cycle of machining. In the determination method, however, there is a problem in that it cannot be determined whether an abnormality occurs unless the single cycle of machining is completed.

The present invention addresses the problem described above with an object of providing a machine tool system that can early determine that an abnormality occurs.

A machine tool system of the present invention that solves the problem described above includes:

- a rotatable spindle capable of releasably gripping a bar;
- a pusher that biases the bar from a rear end thereof toward a front end thereof to be movable together with the bar in an axial direction thereof; and
- an abnormality determining unit that determines whether an abnormality occurs by monitoring movement of the pusher in the axial direction.

The machine tool system can determine early whether a positional abnormality in the axial direction occurs because the abnormality determining unit monitors movement of the pusher in the axial direction.

Here, the machine tool system may have a pusher position grasping unit that grasps the axial direction position of the pusher. The pusher may have a finger chuck to be detachably coupled to the rear end portion of the bar. The spindle may be movable in the axial direction of the bar, and the abnormality determining unit may determine whether an abnormality occurs by monitoring the movement of the pusher in the axial direction with respect to the movement of the spindle in the axial direction. The movement of the pusher in the axial direction with respect to the movement of the spindle in the axial direction includes a concept that one of the spindle and the pusher does not move. In addition, the abnormality determining unit may determine whether an abnormality occurs at any time during machining or at any time during a grip change. Furthermore, the abnormality determining unit may start an operation of determining whether an abnormality occurs according to a determination start command described in a machining program and may end the operation of determining whether an abnormality occurs according to a determination end command described in the machining program. In this case, the abnormality determining unit may repeat the determination from the start to the end of the determination operation.

In the machine tool system,

- the spindle may be movable in the axial direction, and
- the abnormality determining unit may determine that a first abnormality occurs when a moving distance of the spindle differs from a moving distance of the pusher in a state that the spindle grips the bar.

Since the front end portion of the bar is machined into an unintended shape when the first abnormality occurs, the machining tool may be overloaded or the machine tool system may be broken when the machining continues. In contrast, since this machine tool system can determine that the first abnormality occurs concurrently with the occurrence, the machining tool can be prevented from being overloaded and the machine tool system can be prevented from being broken.

Here, the machine tool system may include a movable tool post to which the machining tool for machining the front end portion of the bar is attached and a machine controller that controls operations of the tool post and the spindle. The machine controller may stop the tool post and the spindle when the abnormality determining unit determines that the first abnormality occurs. The stoppage can surely prevent an overload on the machining tool and a breakage of the machine tool system due to the continuation of machining. The stoppage of the tool post and the spindle includes a concept that at least one of the tool post and the spindle moves and then stops until they are in a safe state. The abnormality determining unit may determine that the first abnormality occurs when the moving distance of the spindle differs from the moving distance of the pusher when the spindle moves in the axial direction. In addition, the abnormality determining unit may determine that the first abnormality occurs when the moving distance of the spindle differs from the moving distance of the pusher in a state that the spindle grips the bar.

In addition, the machine tool system may further include:

a tool post to which a machining tool for machining a front end portion of the bar is attached, the tool post being movable in a direction orthogonal to the axial direction; and a machine controller that controls operations of the tool post and the spindle, in which the machine controller may perform a first retry process that cuts off a machined portion of the bar and restarts machining a front end portion of the bar when the abnormality determining unit determines that the first abnormality occurs.

Execution of the first retry process can reduce the possibility of stoppage of machining. In addition, the consumption of energy regarding wasteful machining time and wasteful machining can be avoided, and wasteful use of the bar can also be suppressed by cutting off the machined portion when the first abnormality occurs.

In addition, the machine tool system may further include:

a tool post to which a machining tool for machining a front end portion of the bar is attached, the tool post being movable in a direction orthogonal to the axial direction;

a cut-off portion transporting device capable of transporting a cut-off portion that is cut off from the bar after machined by the machining tool;

a machine controller that controls operations of the tool post, the spindle, and the cut-off portion transporting device; and a defective product receiver that receives the cut-off portion, wherein the machine controller discharges the cut-off portion to the defective product receiver when the abnormality determining unit determines that the first abnormality occurs.

Since the cut-off portion is discharged to the defective product receiver when the first abnormality occurs, mixture of good products and defective products can be prevented. In addition, the consumption of energy regarding wasteful machining time and wasteful machining can be avoided, and wasteful use of the bar can also be suppressed by cutting off the machined portion when the first abnormality occurs.

Here, the cut-off portion transporting device may transport the cut-off portion to a predetermined position regardless of occurrence of the first abnormality.

In addition, the machine tool system may further include:

a machine controller that controls an operation of the spindle, wherein the abnormality determining unit determines that a second abnormality occurs when the pusher moves in the axial direction in response to movement of the spindle in a state that the spindle releases the bar under control by the machine controller.

This can determine that the abnormality occurs early when the spindle performs a grip change of the bar. Here, the abnormality determining unit may determine that the second abnormality occurs when the pusher moves as the spindle moves in the axial direction during a grip change operation.

In addition, in the machine tool system, the machine controller may perform a second retry process including a gripping operation of the spindle and a releasing operation of the spindle when the abnormality determining unit determines that the second abnormality occurs.

The second retry process can reduce the possibility of stoppage of machining.

In addition, the machine tool system may further include:

a tool post to which a machining tool for machining a front end portion of the bar is attached, the tool post being movable in a direction orthogonal to the axial direction, in which the spindle may be fixed immovably in the axial direction, and the abnormality determining unit may determine that a third abnormality occurs when the pusher moves in a state that the spindle grips the bar.

Since the front end portion of the bar is machined into an unintended shape when the third abnormality occurs, the machining tool may be overloaded or the machine tool system may be broken when machining continues. In contrast, since this machine tool system can determine that the third abnormality occurs concurrently with the occurrence, the machining tool can be prevented from being overloaded and the machine tool system can be prevented from being broken.

In addition, the machine tool system may further include:

a machine controller that controls operations of the tool post and the spindle; and a pusher controller that controls an operation of the pusher, in which the machine controller may perform a third retry process that cuts off a machined portion of the bar and restarts machining a front end portion of the bar when the abnormality determining unit determines that the third abnormality occurs.

Execution of the third retry process can reduce the possibility of stoppage of machining. In addition, the consumption of energy regarding wasteful machining time and wasteful machining can be avoided, and wasteful use of the bar can also be suppressed by cutting off the machined portion when the third abnormality occurs.

In addition, the machine tool system may further include:

a tool post to which a machining tool for machining a front end portion of the bar is attached, the tool post being movable in a direction orthogonal to the axial direction;

a machine controller that controls operations of the tool post and the spindle; and a pusher controller that controls an operation of the pusher, in which the spindle may be fixed immovably in the axial direction, and the abnormality determining unit determines that a fourth abnormality occurs when the pusher does not move regardless of control by the pusher controller in a state that the spindle releases the bar under control by the machine controller.

This can determine that an abnormality occurs early when a grip change of the bar is performed.

In addition, in the machine tool system, the machine controller may perform a fourth retry process including a gripping operation of the spindle and a releasing operation of the spindle when the abnormality determining unit determines that the fourth abnormality occurs.

The fourth retry process can reduce the possibility of stoppage of machining.

According to the present invention, it is possible to provide a machine tool system that can determine early that an abnormality occurs.

DETAILED DESCRIPTION

Embodiments of the present invention will be described below with reference to the drawings. In the embodiment, the present invention will be described using an example in which the present invention is applied to a lathe system including an NC lathe and a bar feeder.

Figure 1:
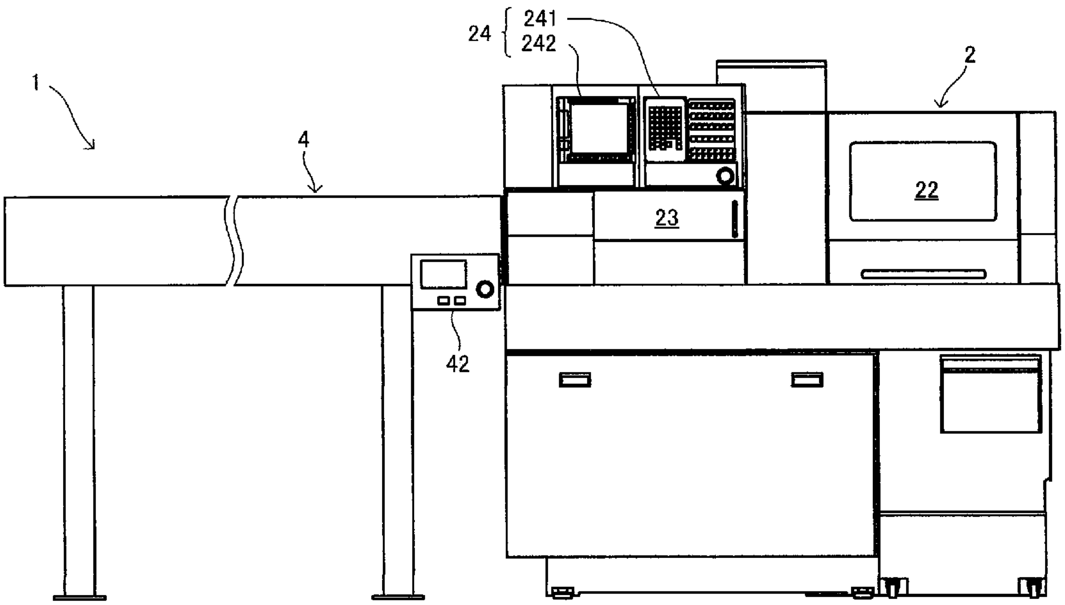
FIG. 1 is a front view of a lathe system of an embodiment.

FIG. 1 is a front view of a lathe system of an embodiment.

As illustrated in FIG. 1, a lathe system 1 of the embodiment includes an NC lathe 2, which is a machining apparatus, and a bar feeder 4, which is a material feeding device. This lathe system 1 corresponds to an example of a machine tool system. The NC lathe 2 of the embodiment is a so-called a Swiss-type lathe. The NC lathe 2 includes a machining chamber 22, a spindle chamber 23, and a lathe operation panel 24. The machining chamber 22 is a chamber having a space for machining the front end portion of a bar W (see FIG. 2) and is disposed on the right side of the NC lathe 2 as viewed from the front side. The spindle chamber 23 is a chamber in which a spindle 25 (see FIG. 2) is provided and is disposed on the left side of the NC lathe 2 as viewed from the front side.

The lathe operation panel 24 includes a lathe operation unit 241 and a lathe display screen 242. The lathe operation unit 241 includes a plurality of buttons, a plurality of keys, and the like that receive input operations by an operator of the lathe system 1. The lathe operation unit 241 may be a touch panel integrated with the lathe display screen 242. The operator of the lathe system 1 can store a machining program created via the lathe operation unit 241 or an external computer in a storage unit 203 (see FIG. 3), which will be described later. In addition, the operator of the lathe system 1 can modify the machining program by using the lathe operation unit 241 and store the modified machining program in the storage unit 203. Furthermore, the operator of the lathe system 1 can instruct the components of the lathe system 1 to operate individually or in cooperation by using the lathe operation unit 241. The lathe display screen 242 is a display that indicates machining programs stored in the storage unit 203 and various types of information about the lathe system 1, such as various settings of the lathe system 1 and error details.

The bar feeder 4 supplies long bars W (see FIG. 2) to the NC lathe 2. The bar feeder 4 is provided alongside the NC lathe 2. The bar feeder 4 stores the plurality of bars W. The bar feeder 4 feeds one of the stored bars W toward the NC lathe 2. In addition, the bar feeder 4 pulls out a remaining bar, which is the bar W shortened by machining, from the NC lathe 2 and discharges the remaining bar. After discharging the remaining bar, the bar feeder 4 feeds a new one of the stored bars W toward the NC lathe 2. The bar feeder 4 has a bar feeder operation panel 42, which is an input device for operating the bar feeder 4.

Figure 2:
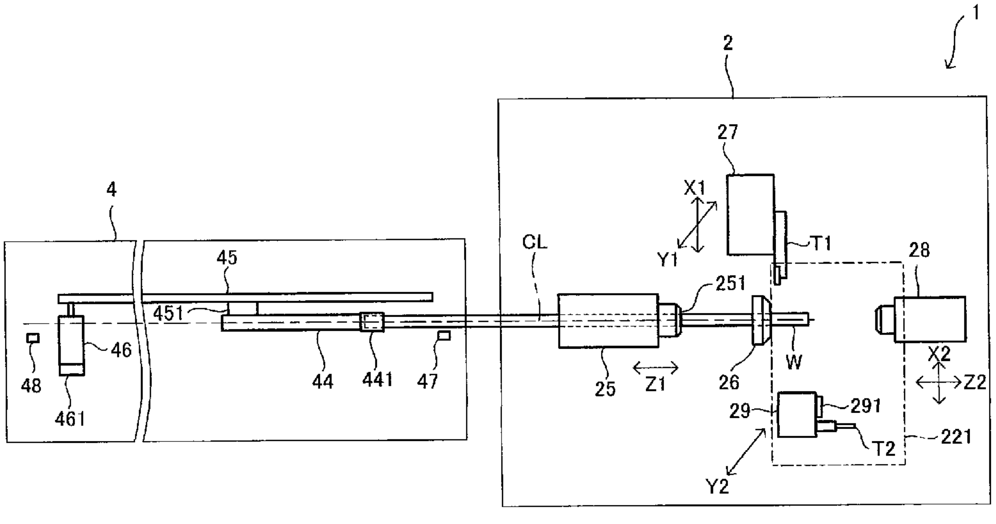
FIG. 2 is a plan view schematically illustrating an internal structure of the lathe system illustrated in FIG. 1.

FIG. 2 is a plan view schematically illustrating an internal structure of the lathe system illustrated in FIG. 1.

As illustrated in FIG. 2, the NC lathe 2 includes the spindle 25, a guide bush 26, a first tool post 27, a back spindle 28, and a second tool post 29. The spindle 25, the guide bush 26, the first tool post 27, the back spindle 28, and the second tool post 29 are disposed on a leg, which is the base. The spindle 25, the first tool post 27, the back spindle 28, and the second tool post 29 operate according to the machining program or inputs from the lathe operation panel 24 (see FIG. 1).

The spindle 25 is movable in a Z1-axis direction. The spindle 25 is mounted on a not-shown headstock to move in the Z1-axis direction together with the headstock. The Z1-axis direction is the horizontal direction and is the left-right direction in FIG. 2. This Z1-axis direction corresponds to the axial direction of the bar W. The spindle 25 has a collet chuck 251 in the front end portion thereof for releasably gripping the bar W passing through the spindle 25. This collet chuck 251 corresponds to an example of a gripping unit. The spindle 25 is rotatable about a spindle axis CL while gripping the bar W. The direction of the spindle axis CL coincides with the Z1-axis direction. The movement of the spindle 25 toward the rear end of the bar W may be referred to below as retraction.

The guide bush 26 is fixed to the leg, which is the base. An end surface of the guide bush 26 opposite to the side on which the spindle 25 is disposed is exposed to the inside of the machining chamber 22 (see FIG. 1). The guide bush 26 supports the front end portion of the bar W having passed through the spindle 25 slidably in the Z1-axis direction. The portion of this guide bush 26 that supports the bar W is rotatable about the spindle axis CL in sync with the spindle 25. The front end portion of the bar W projecting from the guide bush 26 into the machining chamber 22 is machined by a first tool T1 attached to the first tool post 27. This first tool T1 corresponds to an example of a machining tool. Since the guide bush 26 suppresses the bending of the bar W during machining, particularly a long bar W can be machined by the NC lathe 2 with high accuracy.

The first tool post 27 is movable in an X1-axis direction that is orthogonal to the Z1-axis direction and aligned with the horizontal direction, and a Y1-axis direction that is aligned with the vertical direction. This first tool post 27 corresponds to an example of a tool post. In FIG. 2, the vertical direction is the X1-axis direction, and the direction that is orthogonal to the sheet is the Y1-axis direction. A plurality of types of first tools T1 including a tool for cutting, a tool for cut-off, and the like arranged in the Y1-axis direction to form a comb shape are attached to the first tool post 27. In addition, a rotary tool, such as an end mill or a drill, can also be attached to the first tool post 27 as the first tools T1. Any of the plurality of types of first tools T1 is selected by moving the first tool post 27 in the Y1-axis direction. Then, movement of the first tool post 27 in the X1-axis direction causes the selected first tool T1 to cut into and machine the front end portion of the bar W gripped by the spindle 25 and supported by the guide bush 26 or to cut off the machined portion of the bar W.

The back spindle 28 is movable in an X2-axis direction and a Z2-axis direction. This back spindle 28 corresponds to an example of a cut-off portion transporting device. The back spindle 28 is mounted on a not-shown back headstock to move in the X2-axis direction and the Z2-axis direction together with the back headstock. The X2-axis direction is identical to the X1-axis direction described above, and the Z2-axis direction is identical to the Z1-axis direction described above. In addition, the Z2-axis direction corresponds to the axial direction of the back spindle 28. FIG. 2 illustrates the state in which the back spindle 28 is located at a position facing the spindle 25 across the guide bush 26. At this position, the back spindle axis, which is the center of rotation of the back spindle 28, is collinear with the spindle axis CL. The direction of the back spindle axis coincides with the Z2-axis direction. The machined portion of the bar W having been machined by using the spindle 25 is cut off by the first tool T1 for cut-off and passed to the back spindle 28. The machined portion having been cut off is referred to below as the cut-off portion. The back spindle 28 releasably grips the cut-off portion passed from the spindle 25. In addition, the back spindle 28 transports the cut-off portion while gripping the cut-off portion by moving in the X2-axis direction and the Z2-axis direction.

The second tool post 29 is movable in a Y2-axis direction. The second tool post 29 may be movable in the X2-axis direction. The Y2-axis direction is identical to the Y1-axis direction described above. Second tools T2, such as a drill and an end mill for machining a cut-off portion, are attached to the second tool post 29. The plurality of second tools T2 may be attached to the second tool post 29 alongside in the Y2-axis direction. Any of the plurality of types of second tools T2 is selected by moving the second tool post 29 in the Y2-axis direction. Then, part of the cut-off portion closer to the cut-off end gripped by the back spindle 28 is machined by moving the back spindle 28 in the X2-axis direction and the Z2-direction. The part of the cut-off portion closer to the cut-off end that has been machined becomes a product manufactured by the lathe system 1. Using the back spindle 28 may be optional. When the back spindle 28 is not used, the cut-off portion may become a product without being machined. The second tool post 29 has a product receiving port 291 for receiving products and a shooter (not illustrated). The shooter is provided in the second tool post 29. After inserting the product into the product receiving port 291, the back spindle 28 drops the product into the shooter by releasing gripping and pushing the product by using a cylinder provided in the back spindle 28. The dropped product is conveyed to a predetermined position by a conveying member (not illustrated) and discharged to a product storage portion provided outside the lathe system 1.

At the lower end of the machining chamber 22 (see FIG. 1), a chips receiver 221 that receives chips and defective products generated by machining by the spindle 25 or the back spindle 28 is provided. This chips receiver 221 corresponds to an example of a defective product receiver. The machined portion of the bar W having been machined by using the spindle 25 is cut off by the first tool T1 for cut-off with the bar W gripped by the spindle 25 and the back spindle 28 rotating in sync with the spindle 25 at a position facing the spindle 25, and then passed to the back spindle 28. On the other hand, when the machined portion is cut off with the machined portion not gripped by the back spindle 28, the machined portion drops and is discharged to the chips receiver 221.

The bar feeder 4 includes a pusher 44, a pusher driving mechanism 45, a pusher motor 46, a front end sensor 47, and a home position sensor 48 in addition to the bar feeder operation panel 42 (see FIG. 1) described above. The pusher 44 is guided movably in the Z1-axis direction by a guide (not illustrated). A finger chuck 441 for gripping the rear end of the bar W is provided at the front end of the pusher 44. The finger chuck 441 is rotatable about the spindle axis CL, which is a rotational axis, by being rotatably attached to another portion of the pusher 44. The finger chuck 441 grips the rear end of the bar W, and accordingly, the pusher 44 is coupled to the bar W. That is, while the finger chuck 441 grips the bar W, the pusher 44 moves in the Z1-axis direction together with the bar.

The pusher driving mechanism 45 includes pulleys (not illustrated) provided on the front end side and the rear end side of the bar feeder 4 and a drive belt stretched over the pulleys. A coupling portion 451 is fixed to the drive belt. The coupling portion 451 couples the drive belt and the rear end portion of the pusher 44 to each other. The pulley provided on the rear end side of the bar feeder 4 is fixed to the output shaft of the pusher motor 46.

When the output shaft of the pusher motor 46 rotates in one direction, the pusher driving mechanism 45 and the coupling portion 451 move the pusher 44 toward the NC lathe 2 along the Z1-axis. Conversely, when the output shaft of the pusher motor 46 rotates in the other direction, the pusher driving mechanism 45 and the coupling portion 451 move the pusher 44 away from the NC lathe 2 along the Z1-axis. The bar W with having the axis aligned with the spindle axis CL among the plurality of bars W stored in the bar feeder 4 is gripped by the finger chuck 441. Then, when the pusher 44 moves, the bar W gripped by the finger chuck 441 moves in the axial direction of the bar W. That is, the bar W moves toward the front end thereof when the output shaft of the pusher motor 46 rotates in one direction, and the bar W moves toward the rear end thereof when the output shaft of the pusher motor 46 rotates in the other direction. The pusher motor 46 has a pusher encoder 461. The pusher encoder 461 may be provided separately from the pusher motor 46. The pusher encoder 461 detects the number of revolutions and the amount of rotation of the pusher motor 46. The detection results of the pusher encoder 461 are sent to a second control apparatus 40 (see FIG. 3).

The front end sensor 47 detects the front end of the bar W. In addition, the home position sensor 48 detects whether the pusher 44 is located at the home position. The home position of the pusher 44 is located on the rearmost side in the movement range of the pusher 44. The detection results of the front end sensor 47 and the home position sensor 48 are sent to the second control apparatus 40 (see FIG. 3). The second control apparatus 40 grasps the front end position of the bar W before machining based on the detection result of the front end sensor 47 and the detection result of the pusher encoder 461. In addition, the second control apparatus 40 grasps the position of the pusher 44 based on the detection result of the home position sensor 48 and the detection result of the pusher encoder 461. The pusher encoder 461 and the home position sensor 48 correspond to an example of pusher position detection means.

Figure 3:
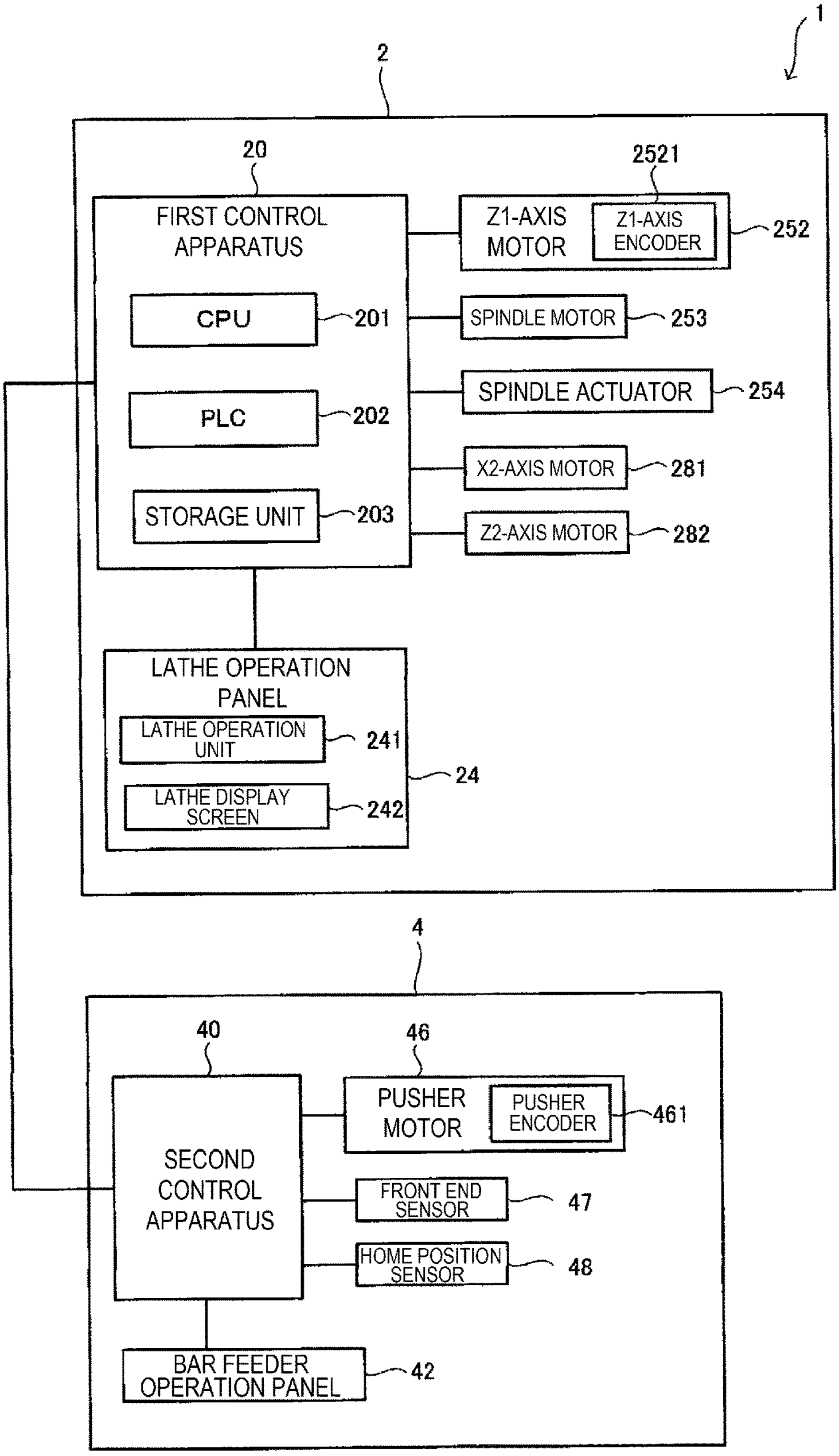
FIG. 3 is a block diagram illustrating a hardware structure of the lathe system illustrated in FIG. 1.

FIG. 3 is a block diagram illustrating a hardware structure of the lathe system illustrated in FIG. 1. FIG. 3 does not illustrate the hardware structure less relevant to the present invention among the hardware structure of the lathe system 1 even if the hardware structure operates the components described above.

As illustrated in FIG. 3, the NC lathe 2 includes a first control apparatus 20, the lathe operation panel 24 described above, a Z1-axis motor 252, a spindle motor 253, a spindle actuator 254, an X2-axis motor 281, and a Z2-axis motor 282. The first control apparatus 20 is a so-called numerical control (NC) apparatus and includes a CPU 201, a programmable logic controller (PLC) 202, and the storage unit 203. This first control apparatus 20 corresponds to an example of a control device. The first control apparatus 20 is a computer having a computing function of the CPU 201. The first control apparatus 20 controls the operations of individual components, such as the spindle 25, the first tool post 27, the back spindle 28, and the second tool post 29 illustrated in FIG. 2, according to the machining program stored in the storage unit 203 and inputs from the lathe operation panel 24. FIG. 3 illustrates some of the motors and actuators that drive these components. The first control apparatus 20 performs numerical control mainly for the servo motor provided in the NC lathe 2. In addition, the PLC 202 of the first control apparatus 20 performs sequence control mainly for the operations of devices other than the servo motors for the cylinder, the valve, and the like provided mainly in the NC lathe 2. The storage unit 203 includes non-volatile memories, such as a ROM, an HDD, and an SSD, and volatile memories, such as a RAM.

The Z1-axis motor 252 is a servo motor that rotates by receiving an instruction from the first control apparatus 20. Rotation of the Z1-axis motor 252 moves the spindle 25 (see FIG. 2) in the Z1-axis direction. An amplifier (not illustrated) may be provided between the first control apparatus 20 and the Z1-axis motor 252, and the first control apparatus 20 controls the Z1-axis motor 252 by sending a command to the amplifier. The amplifier will not be described below. The Z1-axis motor 252 has a Z1-axis encoder 2521. Since the output of the Z1-axis encoder 2521 is fed back to the first control apparatus 20, the first control apparatus 20 always grasps the position of the spindle 25 (see FIG. 2) on the Z1 axis. This Z1-axis encoder 2521 corresponds to an example of spindle position detection means.

The spindle 25 (see FIG. 2) has the spindle motor 253, such as a built-in motor. The spindle motor 253 rotates by receiving an instruction from the first control apparatus 20. As the spindle motor 253 rotates, the spindle 25 and the bar W (see FIG. 2) gripped by the spindle 25 rotate about the spindle axis CL (see FIG. 2). The back spindle 28 may also have a back spindle motor as the spindle 25, but a description thereof will be omitted. The spindle actuator 254 is an actuator, such as a hydraulic cylinder, for operating the collet chuck 251 (see FIG. 2). The spindle actuator 254 moves the chuck sleeve (not illustrated) toward the front end, and accordingly, the collet chuck 251 closes and the bar W is gripped by the spindle 25. In addition, the movement of the chuck sleeve toward the rear end opens the collet chuck 251 and causes the spindle 25 to release the bar W.

The X2-axis motor 281 is a servo motor that rotates by receiving an instruction from the first control apparatus 20. Rotation of the Z2-axis motor 281 moves the back spindle 28 (see FIG. 2) in the X2-axis direction. Similarly, the Z2-axis motor 282 is a servo motor that rotates by receiving an instruction from the first control apparatus 20. Rotation of the Z2-axis motor 282 moves the back spindle 28 in the Z2-axis direction. The X2-axis motor 281 and the Z2-axis motor 282 may be also provided with encoders (not illustrated).

The bar feeder 4 includes the second control apparatus 40 in addition to the bar feeder operation panel 42, the pusher motor 46, the front end sensor 47, and the home position sensor 48 described above. The second control apparatus 40 performs sequence control for the individual components of the bar feeder 4. The second control apparatus 40 controls the operations of actuators (not illustrated) provided in the pusher motor 46 and the bar feeder 4 based on the information received from the sensors, the pusher encoder 461, and the like. In addition, the second control apparatus 40 controls the operation of the bar feeder 4 according to an operation request from the first control apparatus 20.

The pusher motor 46 is a servo motor that rotates by receiving an instruction from the second control apparatus 40. Rotation of the pusher motor 46 moves the pusher 44 (see FIG. 2) in the Z1-axis direction. As described above, the second control apparatus 40 always grasps the position of the pusher 44 in the Z1-axis direction by grasping the moving distance from the home position of the pusher 44 based on the detection result of the home position sensor 48 and the detection result of the pusher encoder 461, and sends the position to the first control apparatus 20 as information about the bar feeder 4. In addition, the second control apparatus 40 sends, to the first control apparatus 20, the position in Z1-axis direction of the front end of the bar W to be newly supplied or the front end of the bar W first fed to the NC lathe 2 after power-on. After the NC lathe 2 starts machining, the pusher motor 46 is controlled by the second control apparatus 40 to rotate in one direction basically at a constant torque until the remaining bar is pulled out. This causes the pusher 44 to bias the bar W toward the front end of the bar W with a set load. This load is set to a relatively small load that does not cause a slip between the bar W and the spindle 25 when the spindle 25 grips the bar W.

The bar feeder operation panel 42 is a touch panel in which an operation unit is integrated with the display screen. The bar feeder 4 may be provided with an emergency stop button, a torque setting switch for the pusher motor 46, and the like in addition to the bar feeder operation panel 42. The operator of the lathe system 1 can manually move the pusher 44 (see FIG. 2) in the Z1-axis direction or input various setting values of the bar feeder 4 by using the bar feeder operation panel 42. In addition, the bar feeder operation panel 42 indicates various types of information about the bar feeder 4, such as various setting values and error details of the bar feeder 4, and operation buttons for the bar feeder 4.

The first control apparatus 20 and the second control apparatus 40 are connected to each other by a signal cable. The first control apparatus 20 sends an operation request or the like to the second control apparatus 40 via the signal cable. In addition, the second control apparatus 40 sends, to the first control apparatus 20, various types of information about the bar feeder 4 including the position information of the pusher 44 at any time via the signal cable.

Figure 4:
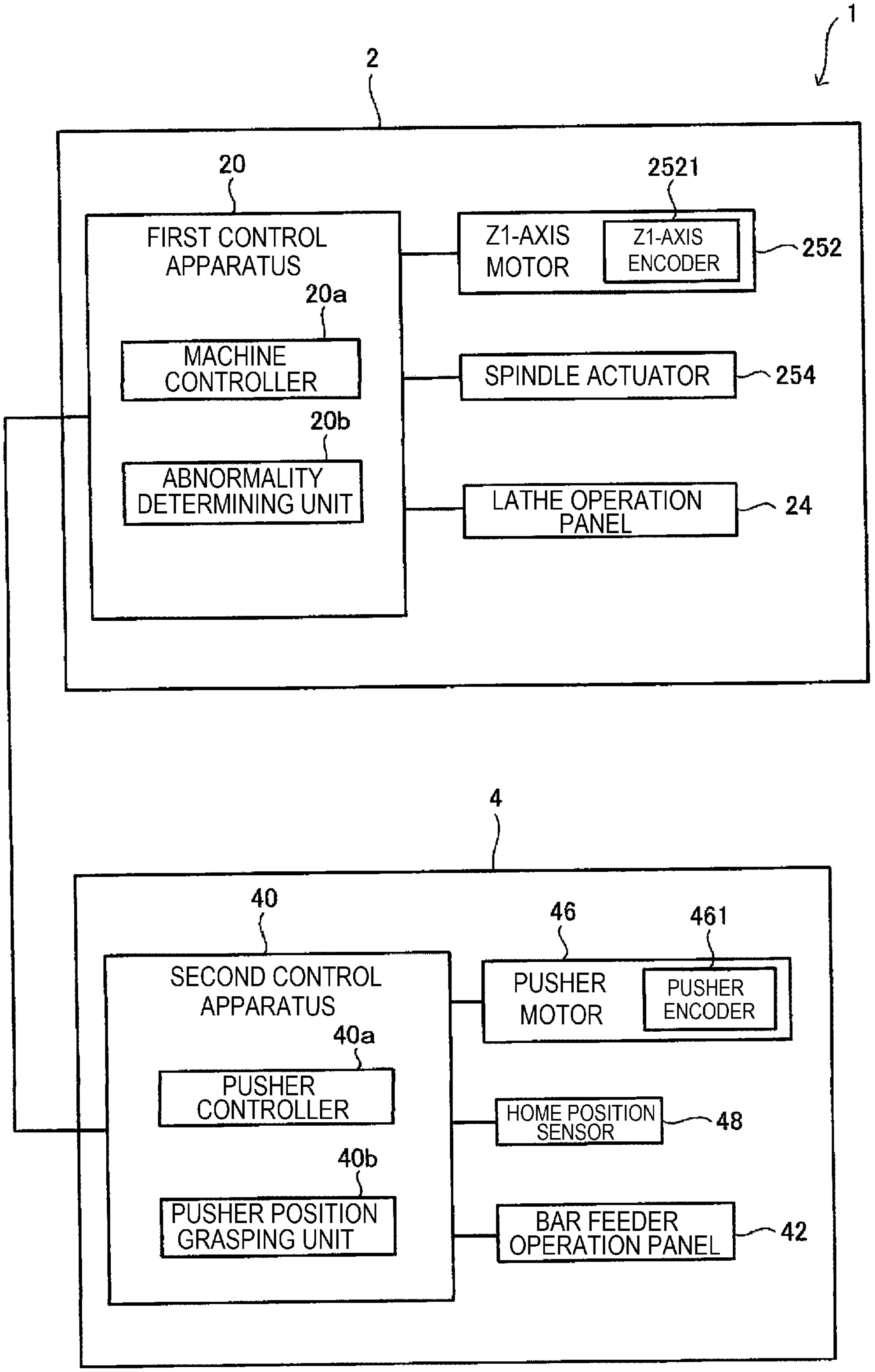
FIG. 4 is a functional block diagram illustrating a functional structure of the lathe system illustrated in FIG. 1.

FIG. 4 is a functional block diagram illustrating a functional structure of the lathe system illustrated in FIG. 1. FIG. 4 also illustrates only the functional structure that is relevant particularly to the present invention, and the other functional structure of the lathe system 1 is not illustrated and described.

As illustrated in FIG. 4, the machine controller 20*a* and the abnormality determining unit 20*b* are implemented by the first control apparatus 20. The machine controller 20*a* has a functional structure mainly achieved by the CPU 201, the PLC 202, and the storage unit 203 illustrated in FIG. 3. In addition, the abnormality determining unit 20*b* has a functional structure mainly achieved by the CPU 201 and the storage unit 203. In addition, a pusher controller 40*a* and a pusher position grasping unit 40*b* are implemented by the second control apparatus 40.

The machine controller 20*a* controls the operations of the individual components of the NC lathe 2. In addition, the machine controller 20*a* may send an operation request or an information sending request to the second control apparatus 40. The abnormality determining unit 20*b* determines whether an abnormality of the lathe system 1 occurs by monitoring movement of the pusher 44 in the Z1-axis direction.

The pusher controller 40*a* has a functional structure that controls the operations of the pusher motor 46 and the like according to outputs from various sensors provided in the bar feeder 4, an input from the bar feeder operation panel 42, and an operation request from the first control apparatus 20. The pusher position grasping unit 40*b* grasps the rear end position of the pusher 44 (see FIG. 2) by calculating the Z1-axis direction position of the pusher 44 from the home position sensor 48 according to the detection result of the home position sensor 48 and the detection result of the pusher encoder 461. The memory (not illustrated) of the second control apparatus 40 stores the length information of the pusher 44 (see FIG. 2). The pusher position grasping unit 40*b* also grasps the front end position by adding the length of the pusher 44 to the rear end position of the pusher 44.

Figure 5:
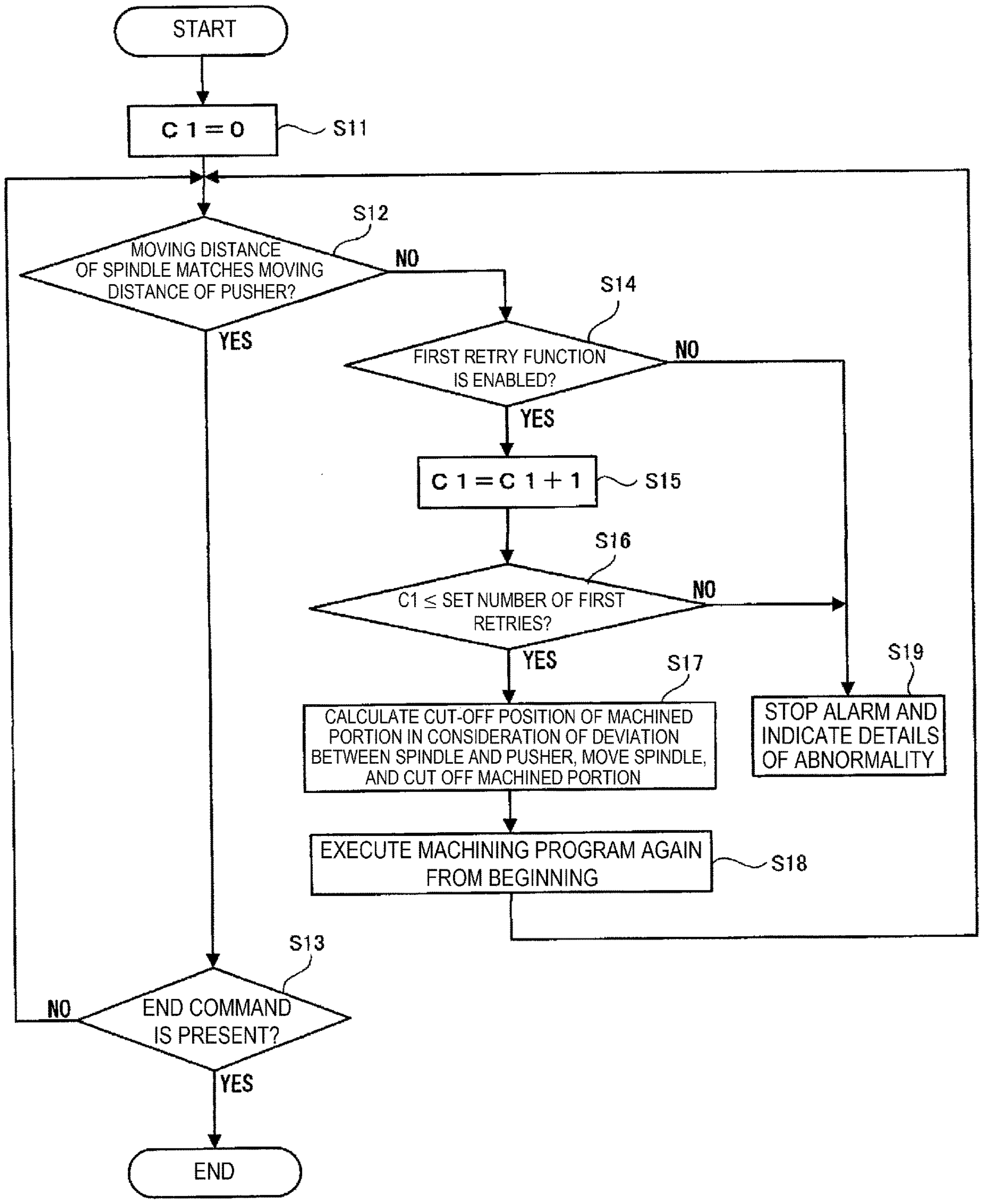
FIG. 5 is a flowchart illustrating a first monitoring operation of the lathe system illustrated in FIG. 1.

FIG. 5 is a flowchart illustrating a first monitoring operation of the lathe system illustrated in FIG. 1. The first monitoring operation illustrated in FIG. 5 is performed by mainly the machine controller 20*a* and the abnormality determining unit 20*b* illustrated in FIG. 4 controlling the operation of the lathe system 1. Specifically, the machine controller 20*a* and the abnormality determining unit 20*b* perform calculation and determination relevant to this operation according to a program stored in the storage unit 203. Then, according to the calculation result and the determination result, the machine controller 20*a* controls the operations of the individual components of the NC lathe 2 and sends an operation request to the second control apparatus 40.

The first monitoring operation starts upon execution of a command for instructing the first monitoring operation described in the machining program. This command for instructing the first monitoring operation corresponds to an example of a determination start command. The first monitoring operation is an operation to be performed during machining using the spindle 25. In the first monitoring operation, the machine controller 20*a* first sets a first counter C1 stored in the storage unit 203 to 0 (S11). After that, the abnormality determining unit 20*b* determines whether the moving distance of the spindle 25 matches the moving distance of the pusher 44 in a state that the spindle 25 grips the bar W according to the acquired gripping information of the spindle 25, the acquired position information of the spindle 25, and the position information of the pusher 44 received from the pusher position grasping unit 40*b* (step S12). The first monitoring operation will be described in more detail. The abnormality determining unit 20*b* stores the position of the spindle 25 at a specific timing, such as before the start of movement of the spindle 25, as the spindle reference position in the storage unit 203, and stores the position of the pusher 44 at this timing as the pusher reference position in the storage unit 203. Then, the abnormality determining unit 20*b* calculates the position of the pusher 44 assuming that the pusher 44 moves, from the pusher reference position, by the distance that matches the moving distance of the spindle 25 from the spindle reference position in the state that the spindle 25 grips the bar W. Furthermore, the abnormality determining unit 20*b* determines whether the moving distance of the spindle 25 matches the moving distance of the pusher 44 by comparing the calculated position information of the pusher 44 with the position information of the pusher 44 received from the pusher position grasping unit 40*b*. The determination in step S12 may be performed only when the spindle 25 moves. However, since the bar W may slip in the Z1-axis direction due to the machining load applied to the bar W even when the spindle 25 does not move, the determination may be performed preferably at any time when the spindle 25 grips the bar W regardless of whether the spindle 25 moves. The abnormality determining unit 20*b* determines that the first abnormality occurs when the moving distances differ from each other (NO in step S12). The abnormality determining unit 20*b* may determine that the moving distances match each other if the difference falls within a specified threshold even when the moving distances do not completely match each other. In addition, in the structure, the threshold may be specified or changed via the lathe operation panel 24 or an NC program. It is assumed that the spindle 25 and the pusher 44 both move in the Z1-axis direction here and this also applies to the following description. In addition, at least one of the moving distance of the spindle 25 and the moving distance of the pusher 44, may be zero, that is, the spindle 25 or the pusher 44 does not need to move.

When the moving distance of the pusher 44 matches the moving distance of the spindle 25 (YES in step S12), the abnormality determining unit 20*b* determines whether the command to be executed next is a command for instructing the end of the first monitoring operation (step S13). This command for instructing the end of the first monitoring operation corresponds to an example of a determination end command. When the next command is the command for instructing the end of the first monitoring operation (YES in step S13), the first monitoring operation ends. When the next command is not the command for instructing the end of the first monitoring operation (NO in step S13), the processing returns to step S12 and the first monitoring operation is continued. The determination in step S12 is performed at any time during machining, by repeating step S12 and step S13. In step S13, instead of determining whether the next command is the command for instructing the end of the first monitoring operation, the abnormality determining unit 20*b* may determine whether machining using the spindle 25 has been performed in a single cycle of machining or may determine whether a command for instructing the spindle 25 to release the bar W has been executed. Here, a single cycle refers to the period from when the spindle 25 releases the bar W and starts a grip change of the bar W until the machined portion of the bar W is cut off. In addition, machining using the spindle 25 refers to a series of machining to be performed on the front end portion of the bar W gripped by the spindle 25. The series of machining includes a cut off operation that cuts off the machined portion.

When the moving distance of the pusher 44 does not match the moving distance of the spindle 25 (NO in step S12), the machine controller 20*a* determines whether the first retry function is enabled (step S14). The enabling or disabling of the first retry function is specified by the command for instructing the first monitoring operation and the specified value is stored in the storage unit 203. The enabling or disabling of the first retry function may be specified separately from the command for instructing the first monitoring operation.

When the first retry function is enabled (YES in step S14), the machine controller 20*a* rewrites the first counter C1 stored in the storage unit 203 to C1+1 (step S15). Then, the machine controller 20*a* determines whether the first counter C1 after being rewritten is equal to or less than the set number of first retries (step S16). The set number of first retries is specified by the command for instructing the first monitoring operation stored in the storage unit 203. The set number of first retries may be specified separately from the command for instructing the first monitoring operation.

When the first counter C1 is equal to or less than the set number of first retries (YES in step S16), the machine controller 20*a* calculates a cut-off position of the spindle 25 according to the acquired difference between the moving distance of the spindle 25 and the moving distance of the pusher 44 (step S12) and the length of the machined portion that has been machined by that time. Then, the machine controller 20*a* moves the spindle 25 to the cut-off position to cut off the entire machined portion by using the first tool T1 for cut-off (step S17). A slip of the bar W from the collet chuck 251 in the Z1-axis direction may cause the difference between the moving distance of the pusher 44 and the moving distance of the spindle 25. In this case, the entire machined portion may be a defective product having an unintended shape. In step S17, since the entire machined portion is not gripped by the back spindle 28, the cut-off portion drops to the chips receiver 221. After that, the machine controller 20*a* performs the operation again from the beginning of a single cycle in the machining program (step S18). Step S17 and step S18 described above correspond to an example of a first retry process.

On the other hand, when the first retry function is disabled (NO in step S14) or the first counter C1 exceeds the set number of first retries (NO in step S16), the machine controller 20*a* moves the first tool post 27 such that the first tool T1 is away from the bar W, stops the operations of the driving units of the lathe system 1, such as the spindle 25, the first tool post 27, and the pusher 44, and indicates that there is a deviation between the moving distance of the pusher 44 and the moving distance of the spindle 25 on the lathe display screen 242 (step S19). In step S19, the first control apparatus 20 may stop the operations of the driving units without moving the first tool post 27.

Figure 6:
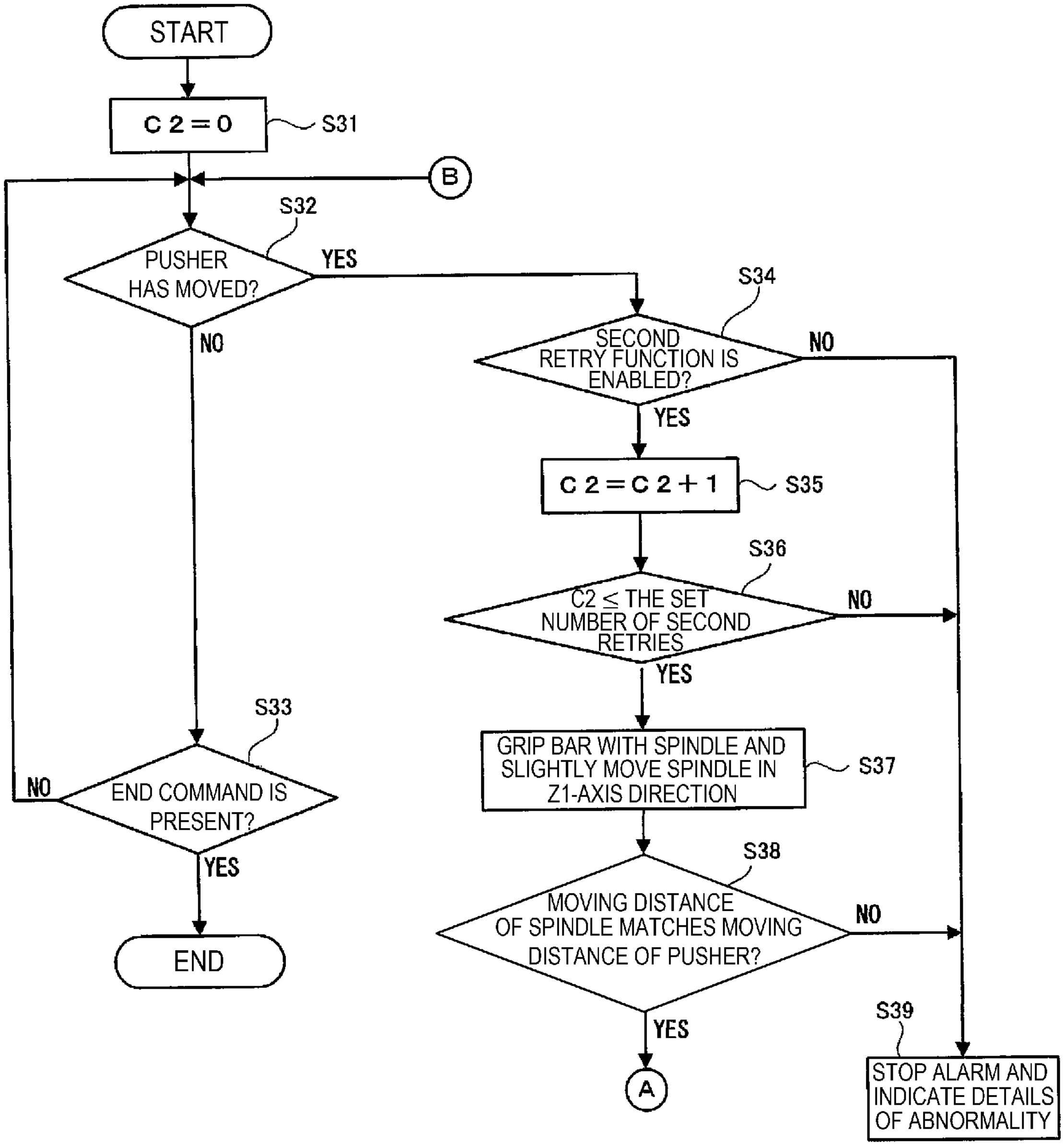
FIG. 6 is a flowchart illustrating a second monitoring operation of the lathe system illustrated in FIG. 1.
Figure 7:
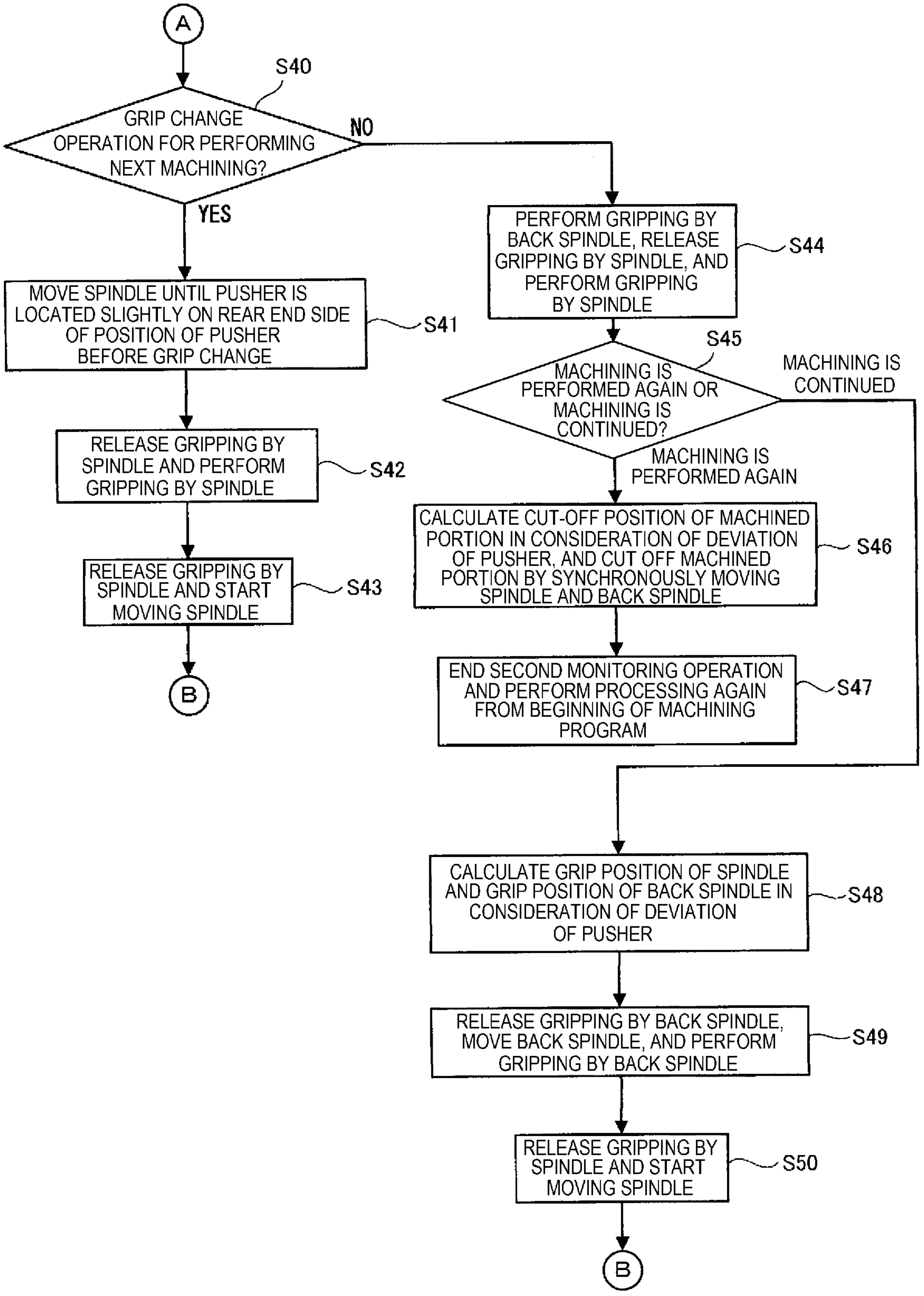
FIG. 7 is a flowchart illustrating the second monitoring operation of the lathe system illustrated in FIG. 1.

FIGS. 6 and 7 are flowcharts illustrating a second monitoring operation of the lathe system illustrated in FIG. 1. The second monitoring operation illustrated in FIGS. 6 and 7 is also performed mainly by the machine controller 20*a* and the abnormality determining unit 20*b* illustrated in FIG. 4 as the first monitoring operation. Specifically, the machine controller 20*a* and the abnormality determining unit 20*b* perform calculation and determination relevant to this operation according to a program stored in the storage unit 203. Then, according to the calculation result and the determination result, the machine controller 20*a* controls the operations of the individual components of the NC lathe 2 and sends an operation request to the second control apparatus 40.

The second monitoring operation starts upon execution of a command for instructing the second monitoring operation described in the machining program. This command for instructing the second monitoring operation corresponds to an example of a determination start command. The second monitoring operation is an operation to be performed during a grip change of the bar W by the spindle 25. In the second monitoring operation, the machine controller 20*a* first sets a second counter C2 stored in the storage unit 203 to 0 (step S31). After that, the abnormality determining unit 20*b* determines whether the pusher 44 moves in response to the movement of the spindle 25 in a state that the spindle 25 releases the bar W according to the acquired gripping information of the spindle 25, the acquired position information of the spindle 25, and the position information of the pusher 44 received from the pusher position grasping unit 40*b* (step S32). The second monitoring operation will be described in more detail. The abnormality determining unit 20*b* stores, in the storage unit 203, the position of the pusher 44 at a predetermined timing before the spindle 25 starts moving, and then compares the stored position information with the position information of the pusher 44 received from the pusher position grasping unit 40*b* while the spindle 25 moves. Then, the abnormality determining unit 20*b* determines that the second abnormality occurs when the pusher 44 moves in response to the movement of the spindle 25 (YES in step S32). The abnormality determining unit 20*b* may determine that the pusher 44 does not move regardless of the movement of the spindle 25 if the moving distance falls within a specified threshold even when the moving distance is not completely zero. In addition, in the structure, the threshold may be specified or changed via the lathe operation panel 24 or an NC program.

When the pusher 44 does not move regardless of the movement of the spindle 25 (NO in step S32), the abnormality determining unit 20*b* determines whether the command to be executed next is a command for instructing the end of the second monitoring operation (step S33). This command for instructing the end of the second monitoring operation corresponds to an example of a determination end command. When the next command is the command for instructing the end of the second monitoring operation (YES in step S33), the second monitoring operation ends. When the next command is not the command for instructing the end of the second monitoring operation (NO in step S33), the processing returns to step S32 and the second monitoring operation is continued. In step S33, instead of determining whether the next command is the command for instructing the end of the second monitoring operation, the abnormality determining unit 20*b* may determine whether the spindle 25 has retracted to the grip change position or may determine whether a command for instructing the spindle 25 to grip the bar W has been executed. The determination in step S32 is performed at any time during a grip change, by repeating step S32 and step S33.

When the pusher 44 moves in response to the movement of the spindle 25 (YES in step S32), the machine controller 20*a* determines whether the second retry function is enabled (step S34). The enabling or disabling of the second retry function is specified by the command for instructing the second monitoring operation the specified value is stored in the storage unit 203. The enabling or disabling of the second retry function may be specified separately from the command for instructing the second monitoring operation.

When the second retry function is enabled (YES in step S34), the machine controller 20a rewrites the second counter C2 stored in the storage unit 203 to C2+1 (step S35). Then, the machine controller 20a determines whether the second counter C2 after being rewritten is equal to or less than the set number of second retries (step S36). The set number of second retries is specified by the command for instructing the second monitoring operation and the specified value is stored in the storage unit 203. The set number of second retries may be specified separately from the command for instructing the second monitoring operation.

When the second counter C2 is equal to or less than the set number of second retries (YES in step S36), the operation in step S37 and step S38 described below is performed to check whether components regarding opening and closing the collet chuck 251, such as the open-close mechanism of the collet chuck 251 and the spindle actuator 254, and components regarding the pusher 44, such as the pusher driving mechanism 45 and the pusher encoder 461 are defective. When any of the components regarding opening and closing the collet chuck 251 or the components regarding the pusher 44 is not defective, no problem occurs because an intended operation is performed even if the spindle 25 moves in the Z1-axis direction in the state that the spindle 25 grips the bar W. However, when any of the components is defective, if the spindle 25 moves in a state of gripping the bar W, movement in the Z1-axis direction differs between the spindle 25 and the bar W. The bar W does not move as expected, possibly causing a collision with a component of the NC lathe. Accordingly, before the spindle 25 moves in the Z1-axis direction for a long distance in the state of gripping the bar W, it is checked in step S37 and step S38 whether the spindle 25 and the bar W normally move the same distance in the Z1-axis direction in this state. However, the operation in step S37 and step S38 may be omitted.

The machine controller 20a slightly moves the spindle 25 in a state of gripping the bar (step S37). When a grip change is performed within a single cycle during, for example, manufacturing of a long product, the back spindle 28 may grip the front end of the bar W. When the back spindle 28 grips the front end of the bar W in step S37, the spindle 25 may grip the bar W, then the back spindle 28 may release the bar W, and then the spindle 25 may slightly move. Then, the machine controller 20a checks whether the moving distance of the spindle 25 matches the moving distance of the pusher 44 when the spindle 25 slightly moves (step S38). When the moving distance of the spindle 25 matches the moving distance of the pusher 44 (YES in step S38), the operation is normal in the state the spindle 25 grips the bar W. Accordingly, no problem occurs even when the spindle 25 moves for a long distance in the state of gripping the bar. In contrast, when these distances do not match each other (NO in step S38), a component regarding opening and closing of the collet chuck 251, a component regarding the pusher 44, or the like may be defective. Accordingly, the bar W may collide with a component of the NC lathe when the spindle 25 moves for a long distance in the state that the spindle 25 grips the bar W.

When the second retry function is disabled (NO in step S34), the second counter C2 exceeds the set number of second retries (NO in step S36), or the moving distance of the spindle 25 does not match the moving distance of the pusher 44 when the spindle 25 moves slightly (NO in step S38), the machine controller 20a stops the operations of the driving units of the lathe system 1, such as the spindle 25, the first tool post 27, and the pusher 44, and indicates a failure of a grip change on the lathe display screen 242 (step S39). The content displayed on the lathe display screen 242 in step S39 may differ from each other between the case of NO in step S34, the case of NO in step S36, and the case of NO in step S38. For example, the lathe display screen may indicate that releasing by the spindle 25 has failed in the case of NO in step S34, indicate that the number of second retries has reached a predetermined number in the case of NO in step S36, and indicate that a grip change mechanism of the lathe system 1 is defective in the case of NO in step S38.

When the moving distance of the spindle 25 matches the moving distance of the pusher 44 (YES in step S38), the machine controller 20a determines whether the second monitoring operation being performed is a grip change operation for performing the next machining (step S40). In this determination, the grip change operation performed first in a single cycle is determined to be the grip change operation for performing the next machining. The operation for monitoring the movement of the pusher 44 in response to the movement of the spindle 25 after the bar W is cut off by the first tool T1 for cut-off may be determined to be the grip change operation for performing the next machining. When the operation is a grip change operation for performing the next machining (YES in step S40), the first tool T1 for cut-off normally functions as a stopper to prevent the bar W from moving toward the front end. Another stopper may be attached to the first tool post 27 to be brought to a position in contact with the front end of the bar W after the machined portion is cut off.

When the second monitoring operation being performed is a grip change operation for performing the next machining (YES in step S40), the machine controller 20a moves the spindle 25 until the pusher 44 is located slightly on the rear end side of the stored position of the pusher 44 before the spindle 25 starts moving (step S41). As a result, the front end of the bar W is disposed at a position facing the first tool T1 for cut-off that function as a stopper with a slight gap between the front end and the first tool T1 for cut-off.

After that, the machine controller 20a controls the spindle actuator 254 such that the spindle 25 performs a releasing operation and a gripping operation (step S42). One reason why the pusher 44 disadvantageously moves as the spindle 25 moves in step S32 may be a biting of the collet chuck 251 into the bar W. When this biting is the cause, the biting of the collet chuck 251 into the bar W may be eliminated by the spindle 25 performing a releasing operation and a gripping operation. One releasing operation and one gripping operation are performed in step S42, but these operations may be performed many times. After the biting is eliminated, the front end of the bar W makes contact with the first tool T1 for cut-off functioning as a stopper by being biased by the pusher 44 and the bar W stops at this position.

Next, the machine controller 20a releases gripping by the spindle 25 and starts moving the spindle 25 toward the grip change position (step S43). The processing returns to step S32 and the second monitoring operation starts again concurrently with the start of the movement. Step S42 and step S43 described above correspond to an example of a second retry process.

When the second monitoring operation being performed is not a grip change operation for performing the next machining (NO in step S40), this operation is a grip change operation within a single cycle. This operation is required when a long product longer than the movable distance of the spindle 25 is manufactured. In the grip change operation, the front end portion of the bar W is inserted into the back spindle 28 and gripped thereby. In this case, the machine controller 20a instructs the back spindle 28 to grip the bar W again and the spindle 25 to perform a releasing operation and a gripping operation (step S44). In step S44, any biting of the collet chuck 251 into the bar W may be eliminated since the spindle 25 performs a releasing operation and a gripping operation while the back spindle 28 prevents movement of the bar W.

Next, the machine controller 20*a* determines whether the machining is performed again from the beginning or the machining is continued (step S45). The selection is specified by the command for instructing the second monitoring operation stored in the storage unit 203. This selection may be specified separately from the command for instructing the second monitoring operation.

When it is determined in step S45 that the machining is performed again from the beginning, the machine controller 20*a* calculates the cut-off positions of the spindle 25 and the back spindle 28 to cut off the entire machined portion according to the deviation of the pusher 44. Then, the machine controller 20*a* synchronously moves the spindle 25 and the back spindle 28 to the positions and cuts off the machined portion by using the first tool T1 for cut-off (step S46). In addition, the machine controller 20*a* releases gripping by the back spindle 28 and uses a cylinder provided on the back spindle 28 to push out the cut-off portion from the back spindle 28. This causes the cut-off portion to drop and to be discharged to the chips receiver 221.

After that, the machine controller 20*a* and the abnormality determining unit 20*b* finish the second monitoring operation. Then, the machine controller 20*a* performs the processing again from the beginning of the single cycle in the machining program (step S47).

When it is determined in step S45 that the machining is continued, the machine controller 20*a* calculates the movement positions of the spindle 25 and the back spindle 28 in consideration of the deviation of the pusher 44 (step S48). For example, the movement position of the spindle 25 may be obtained by shifting the grip change position by the amount of difference between the stored position of the pusher 44 before the spindle 25 starts moving and the position of the pusher 44 at the start of step S48. The movement position of the back spindle 28 may be obtained by shifting the position at the start of a grip change by the amount of the difference.

Then, the machine controller 20*a* releases gripping by the back spindle 28, moves the back spindle 28 to the calculated movement position, and instructs the back spindle 28 to grip the bar W (step S49). Next, the machine controller 20*a* releases gripping by the spindle 25 and starts moving the spindle 25 to the calculated movement position (step S50). The processing returns to step S32 and the second monitoring operation starts again concurrently with the start of the movement. Steps S44 to S50 described above also correspond to an example of the second retry process.

In the lathe system 1 described above, the abnormality determining unit 20*b* can determine early that a positional abnormality occurs in the Z1-axis direction by monitoring the movement of the pusher 44. In particular, since the abnormality determining unit 20*b* monitors the movement of the pusher 44 in the Z1-axis direction with respect to the movement of the spindle 25 in the Z1-axis direction at any time during a machining operation, the abnormality determining unit 20*b* can determine that the first abnormality occurs during the machining operation. When the first abnormality occurs, a slip between the bar W and the spindle 25 has possibly occurred during machining, and the machined portion having been machined so far is machined into an unintended shape. In addition, the position of the bar W gripped by the spindle 25 deviates. Accordingly, when the machining continues under this condition, the first tool T1 may be overloaded because the first tool T1 makes contact with the bar W at an unexpected position, or the machine tool system may be broken because a portion other than the cutting edge of the first tool T1 makes contact with the bar W. Since the lathe system 1 described above determines whether the first abnormality occurs at any time during the machining operation, it is possible to prevent the first tool T1 from being overloaded and the machine tool system from being broken. In addition, early determination of an abnormality can suppress wasteful machining time and wasteful use of the bar W.

Furthermore, execution of the first retry process can reduce the possibility of stoppage of machining. Accordingly, it is possible to reduce the possibility that the number of products manufactured greatly decreases when the operator is not near the lathe system 1 for a long time, particularly at night. In addition, since a machined portion having been machined into an unintended shape, which is a defective product, is cut off in the first retry process, the defective product is prevented from being unnecessarily machined to avoid the wasteful consumption of energy regarding machining time and machining, and wasteful use of the bar W can be suppressed. In addition, since the machined portion that is a defective product is discharged to the chips receiver 221 when the first abnormality occurs, mixture of good products and defective products can be prevented.

In addition, the fact that an abnormality occurs in the grip change of the spindle can be determined by determining whether the second abnormality occurs. This can prevent the next machining from starting under the condition in which a grip change has failed. In particular, since the abnormality determining unit 20*b* monitors the movement of the pusher 44 in the Z1-axis direction at any time during a grip change operation, the fact that the second abnormality occurs during the grip change can be determined early. Early determination eliminates wasteful operations, such as continuation of the grip change operation after occurrence of the second abnormality, and avoids the wasteful consumption of energy regarding machining time and machining. In addition, execution of the second retry process can reduce the possibility of stoppage of machining. Accordingly, it is possible to reduce the possibility that the number of products manufactured greatly decreases when the operator is not near the lathe system 1 for a long time, particularly at night.

Next, the lathe system 1 of the second embodiment will be described. In the following description, the component having the same name as the component as described above is denoted by the same reference numeral described above and duplicate description may be omitted.

Figure 8:
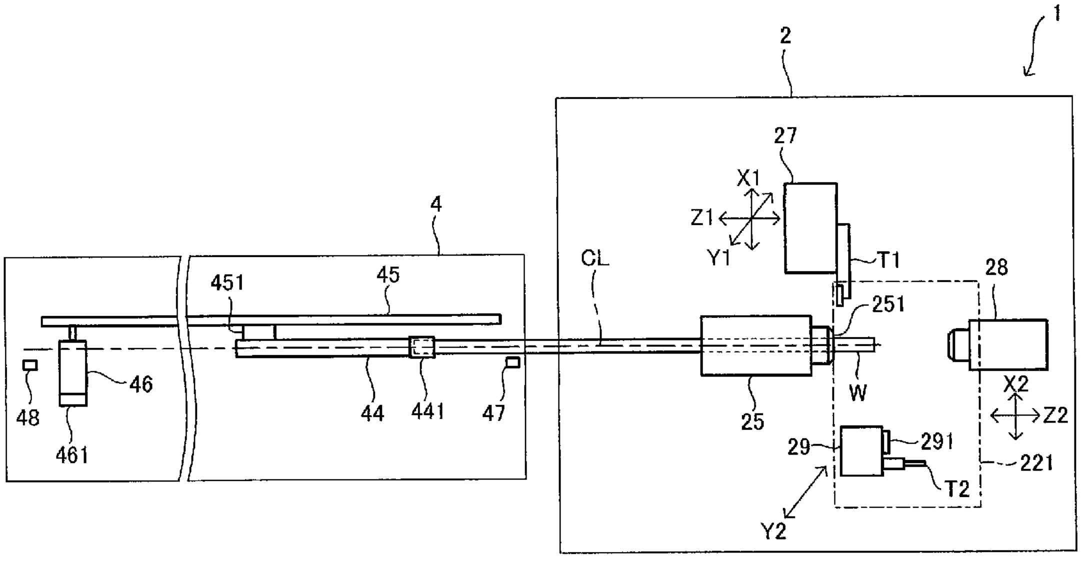
FIG. 8 is a plan view schematically illustrating an internal structure of a lathe system of a second embodiment.

FIG. 8 is a plan view schematically illustrating an internal structure of a lathe system of a second embodiment.

The lathe system 1 illustrated in FIG. 8 differs from the lathe system 1 of the previous embodiment in that the headstock that supports the spindle 25 is fixed and the first tool post 27 is also movable in the Z1-axis direction. The spindle 25 illustrated in FIG. 8 is fixed immovably in all of the X1-axis direction, the Y1-axis direction, and the Z1-axis direction. The spindle 25 is rotatable about the spindle axis CL while gripping the bar W as in the previous embodiment. On the other hand, the first tool post 27 is movable in all of the X1-axis direction, the Y1-axis direction, and the Z1-axis direction. That is, the Z1-axis motor 252 illustrated in FIG. 3 acts as a motor that moves the first tool post 27. In addition, the lathe system 1 illustrated in FIG. 8 differs from the lathe system 1 illustrated in the previous embodiment in that a third monitoring operation is performed instead of the first monitoring operation and a fourth monitoring operation is performed instead of the second monitoring operation.

Figure 9:
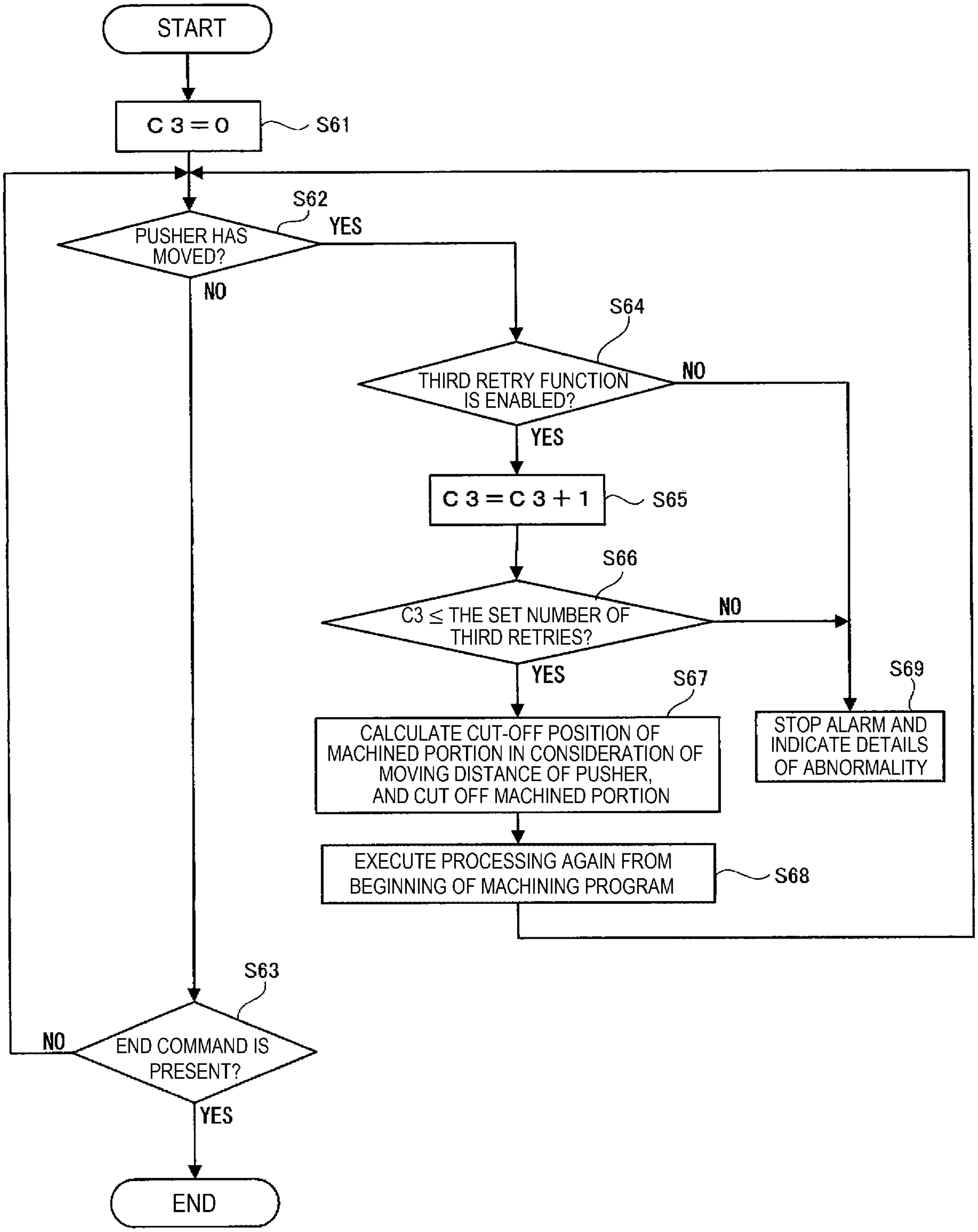
FIG. 9 is a flowchart illustrating a third monitoring operation of the lathe system illustrated in FIG. 8.

FIG. 9 is a flowchart illustrating the third monitoring operation of the lathe system illustrated in FIG. 8. The third monitoring operation illustrated in FIG. 9 is performed by mainly the machine controller 20*a* and the abnormality determining unit 20*b* illustrated in FIG. 4 controlling the operation of the lathe system 1. Specifically, the machine controller 20*a* and the abnormality determining unit 20*b* perform calculation and determination relevant to this operation according to a program stored in the storage unit 203. Then, according to the calculation result and the determination result, the machine controller 20*a* controls the operations of the individual components of the NC lathe 2 and sends an operation request to the second control apparatus 40.

The third monitoring operation starts upon execution of a command for instructing the third monitoring operation described in the machining program. This command for instructing the third monitoring operation corresponds to an example of a determination start command. The third monitoring operation is an operation to be performed during machining with the spindle 25. In the third monitoring operation, the machine controller 20*a* sets a third counter C3 stored in the storage unit 203 to 0 (S61). After that, the abnormality determining unit 20*b* determines whether the pusher 44 moves in response to the movement of the spindle 25 in the state that the spindle 25 grips the bar W according to the acquired gripping information of the spindle 25 and the position information of the pusher 44 received from the pusher position grasping unit 40*b* (step S62). The third monitoring operation will be described in more detail. When the spindle 25 grips the bar W at the start of the third monitoring operation, the abnormality determining unit 20*b* stores the position of the pusher 44 at that time as the pusher reference position in the storage unit 203. In addition, when the spindle 25 releases the bar W at the start of the third monitoring operation, the abnormality determining unit 20*b* stores the position of the pusher 44 as the pusher reference position in the storage unit 203 immediately after the spindle 25 grips the bar W. After that, the abnormality determining unit 20*b* determines whether the pusher 44 has moved from the pusher reference position with the bar W continuously gripped by the spindle 25 according to the position information of the pusher 44 received from the pusher position grasping unit 40*b*. Then, the abnormality determining unit 20*b* determines that the third abnormality occurs when the pusher 44 has moved (YES in step S62). By setting a threshold of the moving distance of the pusher 44, it may be determined that the pusher 44 has not moved if the moving distance falls within the threshold even when the moving distance is not completely zero. In addition, in the structure, the threshold may be specified or changed via the lathe operation panel 24 or an NC program.

When the pusher 44 has not moved (NO in step S62), the abnormality determining unit 20*b* determines whether the command to be executed next is a command for instructing the end of the third monitoring operation (step S63). The command for instructing the end of the third monitoring operation corresponds to an example of a determination end command. When the next command is the command for instructing the end of the third monitoring operation (YES in step S63), the third monitoring operation ends. When the next command is not the command for instructing the end of the third monitoring operation (NO in step S63), the processing returns to step S62 and the third monitoring operation is continued. The determination in step S62 is performed at any time during machining, by repeating step S62 and step S63. In step S63, instead of determining whether the next command is the command for instructing the end of the third monitoring operation, the abnormality determining unit 20*b* may determine whether machining using the spindle 25 has been performed within a single cycle of machining or may determine whether a command for instructing the spindle 25 to release the bar W has been executed.

When the pusher 44 has moved (YES in step S62), the machine controller 20*a* determines whether the third retry function is enabled (step S64). The enabling or disabling of the third retry function is specified by the command for instructing the third monitoring operation and the specified value is stored in the storage unit 203. The enabling or disabling of the third retry function may be specified separately from the command for instructing the third monitoring operation.

When the third retry function is enabled (YES in step S64), the machine controller 20*a* rewrites the third counter C3 stored in the storage unit 203 to C3+1 (step S65). Then, it is determined whether the third counter C3 after being rewritten is equal to or less than the set number of third retries (step S66). The set number of third retries is specified by the command for instructing the third monitoring operation and the specified value is stored in the storage unit 203. The set number of third retries may be specified separately from the command for instructing the third monitoring operation.

When the third counter C3 is equal to or less than the set number of third retries (YES in step S66), the machine controller 20*a* calculates the cut-off position in the Z1-axis direction of the first tool post 27 to cut off the entire machined portion having been machined at that time according to the moving distance of the pusher 44 from the pusher reference position obtained as a result of the monitoring in step S62 and the length of the machined portion. Then, the machine controller 20*a* moves the first tool post 27 to the cut-off position and cuts off the machined portion by using the first tool T1 for cut-off (step S67). When the machined portion is present inside the spindle, the machine controller 20*a* sends an operation request to the second control apparatus 40 such that the spindle 25 releases the bar W and the pusher 44 advances to the position at which the machined portion projects from the spindle 25 toward the front end. Then, when the pusher 44 has advanced, the machine controller 20*a* instruct the spindle 25 to grip the bar W and the first tool T1 for cut-off to cut off the machined portion.

When the pusher 44 has moved in the state that the spindle 25 grips the bar W, a slip in the Z1-axis direction has occurred between the bar W and the collet chuck 251 of the spindle 25 during machining. In this case, the machined portion that have been machined so far is regarded a defective product having an unintended shape. In step S67, since the machined portion is not gripped by the back spindle 28, the cut-off portion is discharged to the chips receiver 221. After that, the machine controller 20*a* performs the processing again from the beginning of the single cycle in the machining program (step S68). Step S67 and step S68 described above correspond to an example of a third retry process.

On the other hand, when the third retry function is disabled (NO in step S64) or the third counter C3 exceeds the set number of third retries (NO in step S66), the machine controller 20*a* moves the first tool post 27 such that the first tool T1 is away from the bar W, stops the operations of the driving units of the lathe system 1, such as the spindle 25, the first tool post 27, and the pusher 44, and indicates that the pusher 44 has moved during machining on the lathe display screen 242 (step S69). It should be noted that, in step S69, the first control apparatus 20 may stop the operations of the driving units without moving the first tool post 27.

Figure 10:
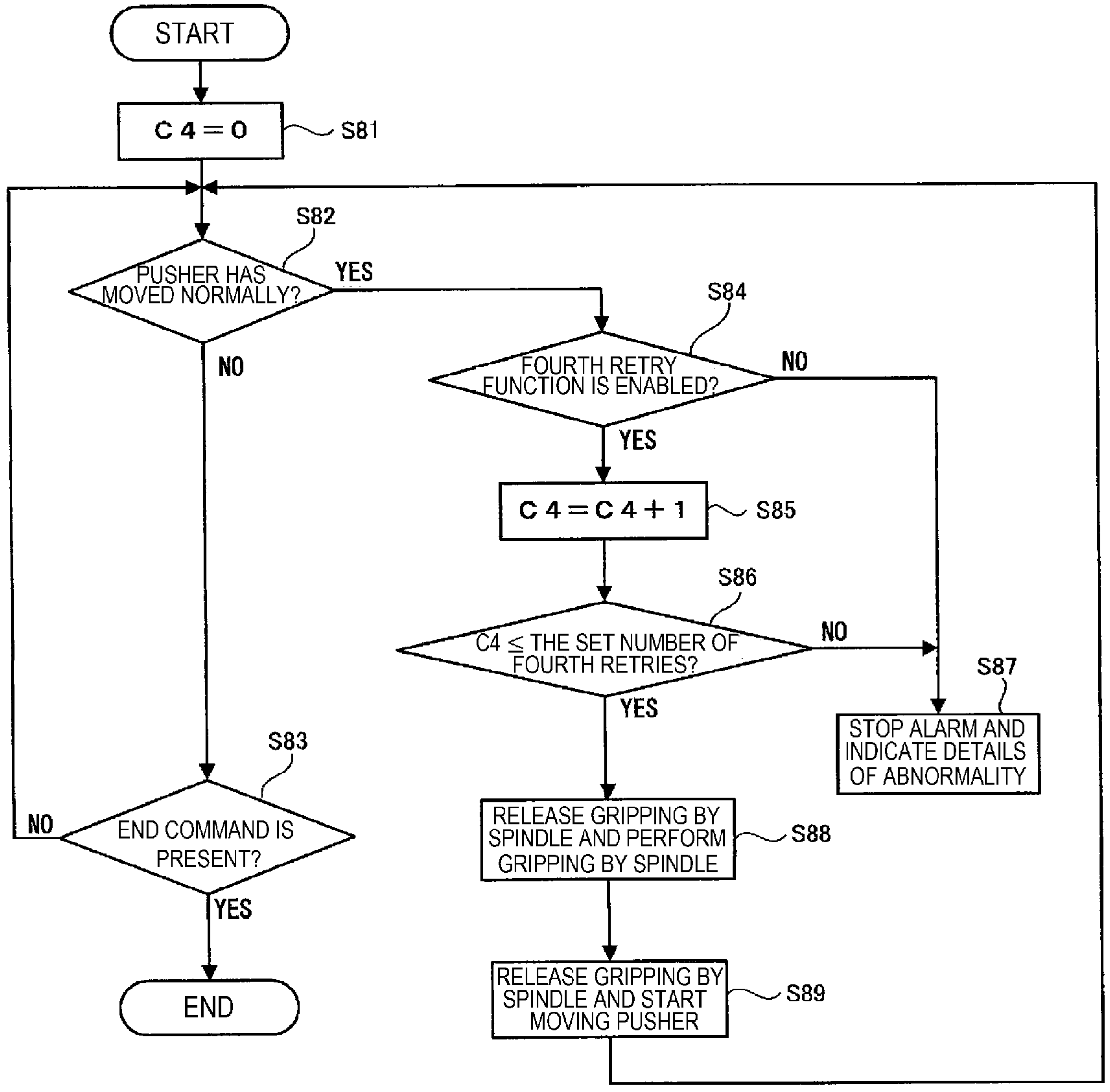
FIG. 10 is a flowchart illustrating a fourth monitoring operation of the lathe system illustrated in FIG. 8.

FIG. 10 is a flowchart illustrating a fourth monitoring operation of the lathe system illustrated in FIG. 8. The fourth monitoring operation illustrated in FIG. 10 is also performed mainly by the machine controller 20*a* and the abnormality determining unit 20*b* illustrated in FIG. 4 as the third monitoring operation. Specifically, the machine controller 20*a* and the abnormality determining unit 20*b* perform calculation and determination relevant to this operation according to a program stored in the storage unit 203. Then, according to the calculation result and the determination result, the machine controller 20*a* controls the operations of the individual components of the NC lathe 2 and sends an operation request to the second control apparatus 40.

The fourth monitoring operation starts upon execution of a command for instructing the fourth monitoring operation described in the machining program. This command for instructing the fourth monitoring operation corresponds to an example of a determination start command. The fourth monitoring operation is an operation to be performed during a grip change of the bar W by the spindle 25. In the lathe system 1 illustrated in FIG. 8, a grip change of the bar W is performed by advancing the pusher 44 in the state that the spindle 25 releases the bar W, and then gripping the bar again by using the spindle 25. In the grip change, the first tool T1 for cut-off is retracted in advance such that the bar W can freely move toward the front end. In the fourth monitoring operation, the machine controller 20*a* first sets a fourth counter C4 stored in the storage unit 203 to 0 (step S81). Then, concurrently with sending of an operation request for advancing the pusher 44 to the second control apparatus 40 from the machine controller 20*a*, the abnormality determining unit 20*b* monitors whether the pusher 44 has moved in response to the operation request in the state that the spindle 25 releases the bar W according to the position information of the pusher 44 received from the pusher position grasping unit 40*b* (step S82). The fourth monitoring operation will be described in more detail. The abnormality determining unit 20*b* monitors the position of the pusher 44 received from the pusher position grasping unit 40*b* when the pusher controller 40*a* drives the pusher motor 46 to advance the pusher 44 in response to an operation request from the machine controller 20*a*. Then, the abnormality determining unit 20*b* determines that the fourth abnormality occurs when the pusher 44 has not moved (NO in step S82). The abnormality determining unit 20*b* may determine that the fourth abnormality occurs when the pusher 44 does not reach the position within a predetermined time, where the position has been requested by the machine controller 20*a* to the second control apparatus 40.

When the pusher 44 has moved (YES in step S82), the abnormality determining unit 20*b* determines whether the command to be executed next is a command for instructing the end of the fourth monitoring operation (step S83). This command for instructing the end of the fourth monitoring operation corresponds to an example of a determination end command. When the next command is the command for instructing the end of the fourth monitoring operation (YES in step S83), the third monitoring operation ends. When the next command is not the command for instructing the end of the fourth monitoring operation (NO in step S83), the processing returns to step S82 and the fourth monitoring operation is continued. In step S83, instead of determining whether the next command is the command for instructing the end of the fourth monitoring operation, the abnormality determining unit 20*b* may determine whether the pusher 44 has moved to the requested position or may determine whether a command for instructing the spindle 25 to grip the bar W has been executed. The determination in step S82 is performed at any time during a grip change, by repeating step S82 and step S83.

When the pusher 44 has not moved (NO in step S82), the machine controller 20*a* determines whether the fourth retry function is enabled (step S84). The enabling or disabling of the fourth retry function is specified by the command for instructing the fourth monitoring operation and the specified value is stored in the storage unit 203. The enabling or disabling of the fourth retry function may be specified separately from the command for instructing the fourth monitoring operation. In addition, concurrently with the determination in step S84, the machine controller 20*a* sends an operation request for stopping the movement of the pusher 44 to the second control apparatus 40.

When the fourth retry function is enabled (YES in step S84), the machine controller 20*a* rewrites the fourth counter C4 stored in the storage unit 203 to C4+1 (step S85). Then, it is determined whether the fourth counter C4 after being rewritten is equal to or less than the set number of fourth retries (step S86). The set number of fourth retries is specified by the command for instructing the fourth monitoring operation and the specified value is stored in the storage unit 203. The set number of fourth retries may be specified separately from the command for instructing the fourth monitoring operation.

When the fourth retry function is disabled (NO in step S84) or the fourth counter C4 exceeds the set number of fourth retries (NO in step S86), the machine controller 20*a* stops the operations of the driving units of the lathe system 1, such as the spindle 25, the first tool post 27, and the pusher 44, and indicates a failure of a grip change on the lathe display screen 242 (step S87). The content displayed on the lathe display screen 242 in step S87 may differ from each other between the case of NO in step S84 and the case of NO in step S86. For example, the lathe display screen may indicate that releasing by the spindle 25 has failed in the case of NO in step S84 and indicate that the number of fourth retries has reached a predetermined number in the case of NO in step S86.

When the fourth counter C4 is equal to or less than the set number of fourth retries (YES in step S86), the machine controller 20*a* controls the spindle actuator 254 such that the spindle 25 performs a releasing operation and a gripping operation (step S88). When the reason why the pusher 44 fails to move in step S82 is a biting of the collet chuck 251 into the bar W, the biting may be eliminated by the spindle 25 performing a releasing operation and a gripping operation. One releasing operation and one gripping operation are performed in step S88, but these operations may be performed many times.

Next, the machine controller 20*a* releases gripping by the spindle 25 and sends an operation request to the second control apparatus 40 to start moving the pusher 44 (step S89). The processing returns to step S82 and the monitoring starts again concurrently with the sending of the operation request. Step S88 and step S89 described above correspond to an example of a fourth retry process.

In the lathe system 1 of the second embodiment as well, the abnormality determining unit 20*b* can determine early that a positional abnormality occurs in the Z1-axis direction by monitoring the movement of the pusher 44. In particular, it is possible to prevent the first tool T1 from being overloaded and the machine tool system from being broken by determining whether the third abnormality occurs at any time during the machining operation. In addition, early determination of an abnormality can suppress wasteful machining time and wasteful use of the bar W.

Furthermore, execution of the third retry process can reduce the possibility of stoppage of machining. Accordingly, it is possible to reduce the possibility that the number of products manufactured greatly decreases when the operator is not near the lathe system 1 for a long time, particularly at night. In addition, since a machined portion having been machined into an unintended shape, which is a defective product, is cut off in the third retry process, the defective product is prevented from being unnecessarily machined to avoid the wasteful consumption of energy regarding machining time and machining, and wasteful use of the bar W can be suppressed. In addition, since the machined portion that is a defective product is discharged to the chips receiver 221 when the third abnormality occurs, mixture of good products and defective products can be prevented.

In addition, the fact that an abnormality occurs in the grip change of the spindle can be determined by determining whether the fourth abnormality occurs. This can prevent the next machining from starting under the condition in which a grip change has failed. In particular, since the abnormality determining unit 20*b* monitors the movement of the pusher 44 in the Z1-axis direction at any time during a grip change operation, the fact that the fourth abnormality occurs during the grip change can be determined early. Early determination eliminates wasteful operations, such as continuation of grip change operation after occurrence of the fourth abnormality, and avoids the wasteful consumption of energy regarding machining time and machining. In addition, execution of the fourth retry process can reduce the possibility of stoppage of machining. Accordingly, it is possible to reduce the possibility that the number of products manufactured greatly decreases when the operator is not near the lathe system 1 for a long time, particularly at night.

The present invention is not limited to the embodiments described above, and various modifications can be made within the scope of the appended claims. For example, in the description of the embodiment, an example of specifying a command for instructing the first monitoring operation and a command for instructing the second monitoring operation is used, but a monitoring command that integrates these may be specified. In addition, during execution of the monitoring command, the first monitoring operation may be performed with the bar W gripped by the spindle 25, or the second monitoring operation may be performed except when the bar feeder 4 moves the pusher 44 with the bar W released by the spindle 25. Alternatively, during execution of the monitoring command, the first monitoring operation may be performed during machining using the spindle 25, or the second monitoring operation may be performed during a grip change operation. The first monitoring operation and the second monitoring operation may be performed by an input from the lathe operation panel 24 instead of the command. In addition, the first monitoring operation and the second monitoring operation may be automatically performed as a standard function of the lathe system 1. In this case, the first monitoring operation may be automatically performed when the bar W is gripped by the spindle 25, or the second monitoring operation may be automatically performed when the spindle 25 moves with the bar W released by the spindle 25.

Similarly, a monitoring command for instructing both the third monitoring operation and the fourth monitoring operation at the same time may be specified. In addition, during execution of the monitoring command, the third monitoring operation may be performed with the bar W gripped by the spindle 25, or the fourth monitoring operation may be performed when the bar feeder 4 moves the pusher 44 with the bar W released by the spindle 25. Alternatively, during execution of the monitoring command, the third monitoring operation may be performed during machining using the spindle 25, or the fourth monitoring operation may be performed during a grip change operation. The third monitoring operation and the fourth monitoring operation may be performed by an input from the lathe operation panel 24 instead of the command. In addition, the third monitoring operation and the fourth monitoring operation may be automatically performed as a standard function of the lathe system 1. In this case, the third monitoring operation may be automatically performed when the bar W is gripped by the spindle 25, or the fourth monitoring operation may be automatically performed when the bar feeder 4 moves the pusher 44 with the bar W released by the spindle 25.

It should be noted that a constituent element included in only one of the embodiments described above or only one of the modifications described above may be applied to another embodiment or another modification.

What is claimed is:

1. A machine tool system comprising:
a rotatable spindle capable of releasably gripping a bar;
a pusher that biases the bar from a rear end thereof toward a front end thereof to be movable together with the bar in an axial direction thereof, and
an abnormality determining unit that determines whether an abnormality occurs by monitoring movement of the pusher in the axial direction;
wherein the spindle is movable in the axial direction, and
the abnormality determining unit determines that a first abnormality occurs when a moving distance of the spindle differs from a moving distance of the pusher in a state that the spindle grips the bar;
wherein the machine tool system further comprises:
a tool post to which a machining tool for machining a front end portion of the bar is attached, the tool post being movable in a direction orthogonal to the axial direction; and
a machine controller that controls operations of the tool post and the spindle,
wherein the machine controller performs a first retry process that cuts off a machined portion of the bar and restarts machining a front end portion of the bar when the abnormality determining unit determines that the first abnormality occurs.

2. A machine tool system, comprising:
a rotatable spindle capable of releasably gripping a bar;
a pusher that biases the bar from a rear end thereof toward a front end thereof to be movable together with the bar in an axial direction thereof; and
an abnormality determining unit that determines whether an abnormality occurs by monitoring movement of the pusher in the axial direction;
wherein the spindle is movable in the axial direction, and
the abnormality determining unit determines that a first abnormality occurs when a moving distance of the spindle differs from a moving distance of the pusher in a state that the spindle grips the bar,
wherein the machine tool system further comprises:

a tool post to which a machining tool for machining a front end portion of the bar is attached, the tool post being movable in a direction orthogonal to the axial direction;

a cut-off portion transporting device capable of transporting a cut-off portion that is cut off from the bar after machined by the machining tool;

a machine controller that controls operations of the tool post, the spindle, and the cut-off portion transporting device; and a defective product receiver that receives the cut-off portion, wherein the machine controller discharges the cut-off portion to the defective product receiver when the abnormality determining unit determines that the first abnormality occurs.

3. A machine tool system, comprising:

a rotatable spindle capable of releasably gripping a bar;

a pusher that biases the bar from a rear end thereof toward a front end thereof to be movable together with the bar in an axial direction thereof; and an abnormality determining unit that determines whether an abnormality occurs by monitoring movement of the pusher in the axial direction;

wherein the machine tool system further comprises:

a machine controller that controls an operation of the spindle, wherein the abnormality determining unit determines that a second abnormality occurs when the pusher moves in the axial direction in response to movement of the spindle in a state that the spindle releases the bar passing through the spindle under control by the machine controller.

4. The machine tool system of claim 3, wherein the machine controller performs a second retry process including a gripping operation of the spindle and a releasing operation of the spindle when the abnormality determining unit determines that the second abnormality occurs.

5. A machine tool system, comprising:

a rotatable spindle capable of releasably gripping a bar;

a pusher that biases the bar from a rear end thereof toward a front end thereof to be movable together with the bar in an axial direction thereof; and an abnormality determining unit that determines whether an abnormality occurs by monitoring movement of the pusher in the axial direction;

wherein the machine tool system further comprises:

a tool post to which a machining tool for machining a front end portion of the bar is attached, the tool post being movable in a direction orthogonal to the axial direction, wherein the spindle is fixed immovably in the axial direction, and the abnormality determining unit determines that a third abnormality occurs when the pusher moves in a state that the spindle grips the bar.

6. The machine tool system of claim 5, further comprising:

a machine controller that controls operations of the tool post and the spindle; and a pusher controller that controls an operation of the pusher, wherein the machine controller performs a third retry process that cuts off a machined portion of the bar and restarts machining a front end portion of the bar when the abnormality determining unit determines that the third abnormality occurs.

7. A machine tool system, comprising:

a rotatable spindle capable of releasably gripping a bar;

a pusher that biases the bar from a rear end thereof toward a front end thereof to be movable together with the bar in an axial direction thereof; and an abnormality determining unit that determines whether an abnormality occurs by monitoring movement of the pusher in the axial direction;

wherein the machine tool system further comprises:

a tool post to which a machining tool for machining a front end portion of the bar is attached, the tool post being movable in a direction orthogonal to the axial direction;

a machine controller that controls operations of the tool post and the spindle; and a pusher controller that controls operations of the pusher, wherein the spindle is fixed immovably in the axial direction, and the abnormality determining unit determines that a fourth abnormality occurs when the pusher does not move regardless of control by the pusher controller in a state that the spindle releases the bar passing through the spindle under control by the machine controller.

8. The machine tool system of claim 7, wherein the machine controller performs a fourth retry process including a gripping operation of the spindle and a releasing operation of the spindle when the abnormality determining unit determines that the fourth abnormality occurs.

* * * * *